United States Patent [19]

Laughbaum

[11] 4,397,674
[45] Aug. 9, 1983

[54] MATERIAL TREATMENT AND WINDROWING APPARATUS

[75] Inventor: Edward E. Laughbaum, Crestline, Ohio

[73] Assignee: Bancohio National Bank, Columbus, Ohio

[21] Appl. No.: 323,179

[22] Filed: Nov. 20, 1981

[51] Int. Cl.³ .............................................. C05F 11/08
[52] U.S. Cl. .......................................... 71/9; 435/287; 366/345; 422/102; 71/15; 71/21
[58] Field of Search ........................................ 71/8–10, 71/11, 15, 21; 422/102; 435/287; 366/345

[56] References Cited

U.S. PATENT DOCUMENTS

| | | | |
|---|---|---|---|
| 3,362,092 | 1/1968 | Speicher et al. | 37/144 |
| 3,369,797 | 2/1968 | Cobey | 259/28 |
| 3,451,799 | 6/1969 | Brown | 71/9 |
| 4,104,048 | 8/1978 | Urbanczyk | 71/21 X |

FOREIGN PATENT DOCUMENTS 1592657  3/1979  Fed. Rep. of Germany ............ 71/9

OTHER PUBLICATIONS

"Composting Converts Waste into Valuable Resources", Farm, Ranch and Home Quarterly, Fall, 1977.
"Dewatering and Composting with Brown Horizontal Auger Attachment" and Brown Bear Hydrostatic Tractor, Sales Literature of Roscoe Brown Corporation.
Basic Information on the "Brown Bear" Composter and City of San Diego Memorandum Dated Jan. 26, 1978, Subject-Brown Bear Auger Composter-Tractor.

*Primary Examiner*—Ferris H. Lander
*Attorney, Agent, or Firm*—Mueller and Smith

[57] ABSTRACT

Self-propelled windrowing apparatus having a forward material treatment housing carrying an elevating structure formed as a drum carrying a plurality of pivotal flails. The flails serve to shred and aerate biodegradable waste and elevate it to a collection auger which manipulates the elevated material to a transfer conveyor mounted within the chassis of the apparatus. The transfer conveyor moves the material to a pivotal windrowing conveyor mounted rearwardly of the apparatus which serves to form symmetrical windrow piles of material.

42 Claims, 11 Drawing Figures

MATERIAL TREATMENT AND WINDROWING APPARATUS

BACKGROUND OF THE INVENTION

The treatment of waste, whether generated through municipal collection systems or through a broad range of industries, may be observed to vary from simple land-fill techniques to somewhat sophisticated pyrogenic, chemical or biochemical conversion methods. With the latter, chemical approach, significant capital commitments generally are called for which require justification by virtue of the degree of environmental protection achieved and/or the generation of monetarily profitable products and by-products of waste.

Controlled composing procedures are considered to offer significant promise in the treatment of biodegradable industrial and municipal wastes and the compost product generated thereby represents a valuable and readily saleable product. A desired approach to treatment of wastes by biodegradation is one wherein composting is carried out in the thermophilic phase at temperatures of about 45°–50° C. At such temperatures, bacteria otherwise active in the mesophilic phase at lower temperatures are avoided and noxious odors are not evolved in the course of digestion.

To achieve a marketable compost product, a waste treatment process should be carried out wherein raw refuse is passed through a variety of screening, shredding and separation stages. These stages serve to remove inorganic components such as metals and plastics and effect a reduction of average waste particle size suitable to permit the derivation of a uniform moisture content throughout the organic material. The thus-treated raw waste represents the starting material for a composting process which, to achieve a marketable end compost product, must during digestion substantially provide a continuous uniformity of material and moisture, proper mixing and aeration as digestive breakdown occurs.

One important and highly practical approach to carrying out thermophilic digestion is that of windrowing the waste material. With this approach, long rows of waste are developed which are laterally transferred across the surface of a treatment region and, in consequence of this manipulation, are aerated and agitated. Thus, the waste material progressively is transferred from one row position to a next, for example, from right to left, across the treatment region over a period of time until a last row position is reached at which point the digestive process is completed. The resultant fully digested compost represents a most valuable soil additive.

More advanced windrowing facilities, described, for example, in U.S. Pat. No. 4,302,236, by Roman, assigned in common herewith, provide a somewhat expansive graded and paved surface for windrow development. In addition to providing for moisture input to the composting material, these treatment surfaces are designed for environmental protection and for enhancing the aeration of composting waste by providing controlled blown air inputs beneath each elongate windrow. Thus, with this more advanced windrowing technique, a long windrow of waste having been treated by separation of certain inorganic materials and shredding is initially deposited along a first row position and, if necessary, adjustment of moisture content is made. Row positioning is such that the material is deposited over a first elongate air duct to provide for the blowing of air upwardly thereinto. As thermophilic decomposition ensues, a windrowing machine must be employed to agitate, mix and move the windrow material to a position over a next parallel succeeding air duct to continue the process. This movement of the windrow piles is highly important, providing necessary intermixing of thermophilic bacteria with the material and permitting air access thereinto. During periods of rainfall, individual windrows being treated may receive an excess of moisture and for such conditions, the windrow machines should be capable of agitating and mixing the material without transferring it from one row position to the next. Digestion of the material within the windrows also is affected by the size of the windrow piles in terms of their height, as well as by the symmetry of the piles which are developed. Particularly where air is forced through the piles from elongate ducts located at the bottom thereof, improved aeration is achieved with the development of symmetrical windrow cross-section.

A variety of windrowing machines have been proposed or employed by the industry. One such machine currently utilized incorporates an elevating device which resembles a flight conveyor having a series of parallel, elongate paddles which are mutually interconnected by continuous chains and driven by a hydraulic motor. In operation, a rather large front end loader is utilized to suspend the elevator or conveyor at an angle both with respect to the ground and the axis of the windrow pile while moving forward at a relatively low speed, for instance 1 m.p.h., such that the lower disposed region or side of the elevator confronts the row of material and, in effect, thrusts it into an adjacent row. The type of front end loader employed for this procedure necessarily is rather large, typically, a 202 hp loader weighing about 2,600 tons being required.

In U.S. Pat. No. 4,290,703, entitled "Windrowing-Type Composting Apparatus", by Roman, and assigned in common herewith, apparatus is provided wherein a flight-type windrow elevator or conveyor is supported forwardly upon a rigid frame which, in turn, is supported by three freely rotatable wheels. By so positioning these wheels about the frame, the windrow conveyor is properly positioned to confront a row of waste material being transferred and the supporting wheels of the frame of the apparatus do not encounter the waste. This device is configured for connection with a front-end loader and may utilize a self-contained motor for providing hydraulic power to the wndrow conveyor components. Lower powered front-end loaders or the like may be utilized with this improved apparatus. A frame mounted conveyor of similar configuration which is self-propelled is disclosed in U.S. application for patent, Ser. No. 255,752, entitled "Windrowing Type Composting Apparatus", by Roman, filed Apr. 20, 1981, and assigned in common herewith.

The type windrowing apparatus described above, while effective for typical utilization, has limitations with respect to the size of windrow pile which can be developed. Additionally, such windrowing devices necessarily develop nonsymmetrical windrow cross sections. Further, it is necessary to provide right-hand and left-hand sense devices for any given installation to avoid a gradual material creep along the longitudinal axis of the windrow piles in the course of shifting them from one position to the next. Of course, such devices are not practical for use in agitating windrowed material without moving the windrow laterally.

SUMMARY

The present invention is addressed to windrowing apparatus enjoying highly improved operational flexibility and a capability for an enhanced agitating, shredding, mixing and aerating of biodegradable windrowed material. Through the utilization of forwardly disposed elevating and collecting arrangement in operative association with an elongate row-forming conveyor, the self-propelled apparatus is capable of confronting a windrow in alignment with its longitudinal axis and carrying out material transference to a next adjacent windrow in a manner achieving ideal windrow height and symmetry. Because the row forming conveyor is movable in pivotal fashion about the apparatus including a directly rearward position, a capability for carrying out the in situ mixing, agitating and aerating of windrow material without laterally transferring the windrow is provided. Thus, improved treatment to control excess moisture within a given windrow is availed.

A further feature and object of the invention is to provide windrowing apparatus having a unique, forwardly disposed elevating and collecting arrangement which includes a cylindrical component mounted forwardly of the front wheels of the apparatus. This component carries a plurality of elongate thrust components and is rotatably driven. These thrust components are pivotally mounted upon the cylindrical component and act as flails which confront the windrow material, both mix and shred it and elevate it upwardly and rearwardly into the apparatus. The collecting arrangment is also mounted upon the chassis of the apparatus forwardly of the front wheels and is configured for receiving the material elevated by the assembly of flails and serves to effect the movement of the thus elevated material to a collection position located with the chassis of the apparatus. From this collection position, a conveyance arrangement supported upon the chassis serves to receive the thus collected material for transference by the row forming conveyor. Transference may be provided by a conveyor mounted within the chassis of the windrowing apparatus which delivers the material from the collection position to the above-described row-forming conveyor. The row-forming conveyor is capable of transferring the material to a selected next adjacent windrow to provide a windrow of ideal height and symmetrical cross section.

As another object of the invention, windrowing apparatus as above-described is provided having a collection arrangement which is present as a spiral conveyor the horizontal axis of which is located rearwardly of the axis of the cylindrical component and along a radius of about 45° with respect to a vertical reference extending from the axis of the cylindrical component. Thus, the spiral conveyor is positioned for receiving the material elevated by the plurality of flails and moving it to the noted collection position. In a preferred embodiment, the spiral conveyorcomprises a right-hand spiral flight and a left-hand spiral flight, each of the flights being mounted in conjunction with a housing arrangement having an elongate, forwardly disposed opening for receiving material entering the collection arrangement and which is further configured to define a downwardly disposed opening representing the collection position. Preferably, this collection position is located at about the widthwise midpoint of the chassis such that the material may be received at that convenient position for transference by conveyor to the rearwardly disposed portions of the chassis.

As another object of the invention, an embodiment is provided for the elevator arrangement of cylindrical component and associated pivotally coupled flairs. With this embodiment, augers are positioned at either end of the cylindrical component which have widths corresponding with the front wheels of the apparatus. These augers operate to move material inwardly toward the flail region of the cylindrical component to provide a residence shredding and mixing interval while carrying out the further function of clearing material from the paths of the front wheels of the apparatus. Additionally, the augers provide for conservation of the energy otherwise required to drive the cylindrical component-flail assemblage.

As another object of the invention, windrowing apparatus as above described is provided which includes a chassis having front and rear ground-engaging wheels as well as a housing which is removably mounted upon the chassis forwardly of the front wheels. The housing is provided having a substantially open forwardly disposed portion which extends to ground surface and which has a rearwardly disposed collection opening. Within the housing are mounted an elevator arrangement as above described which includes a plurality of elongate thrust components which are drivably rotatable about a horizontally disposed axis for confronting, contacting and elevating the material of a windrow which has been engaged thereby. Such movement provides for a substantial upward and rearward thrusting of the material. The collecting arrangement of the apparatus is mounted within the housing and is provided upwardly and rearwardly of the elevator arrangement so as to receive the elevated material and to transport the received material to a forward collection position corresponding with the housing collection opening. A conveyance arrangement supported upon the chassis then receives the material from the housing at the collection opening for transferring it to the center line of a select windrow. Because the housing is removable from the chassis, preferably being pivotally coupled thereto, it may be removed for transport to a given site separately from the chassis, greatly facilitating such transport. Additionally, inasmuch as the housing supports elevating and collection components which are subject to the highest dynamic forces of the apparatus, the housing may be facily removed for maintenance purposes and is replaceable for continued utilization of the windrowing apparatus during maintenance and repair procedures.

Other objects of the invention will, in part, be obvious and will, in part, appear hereinafter. The invention, accordingly, comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION

Figure 1:
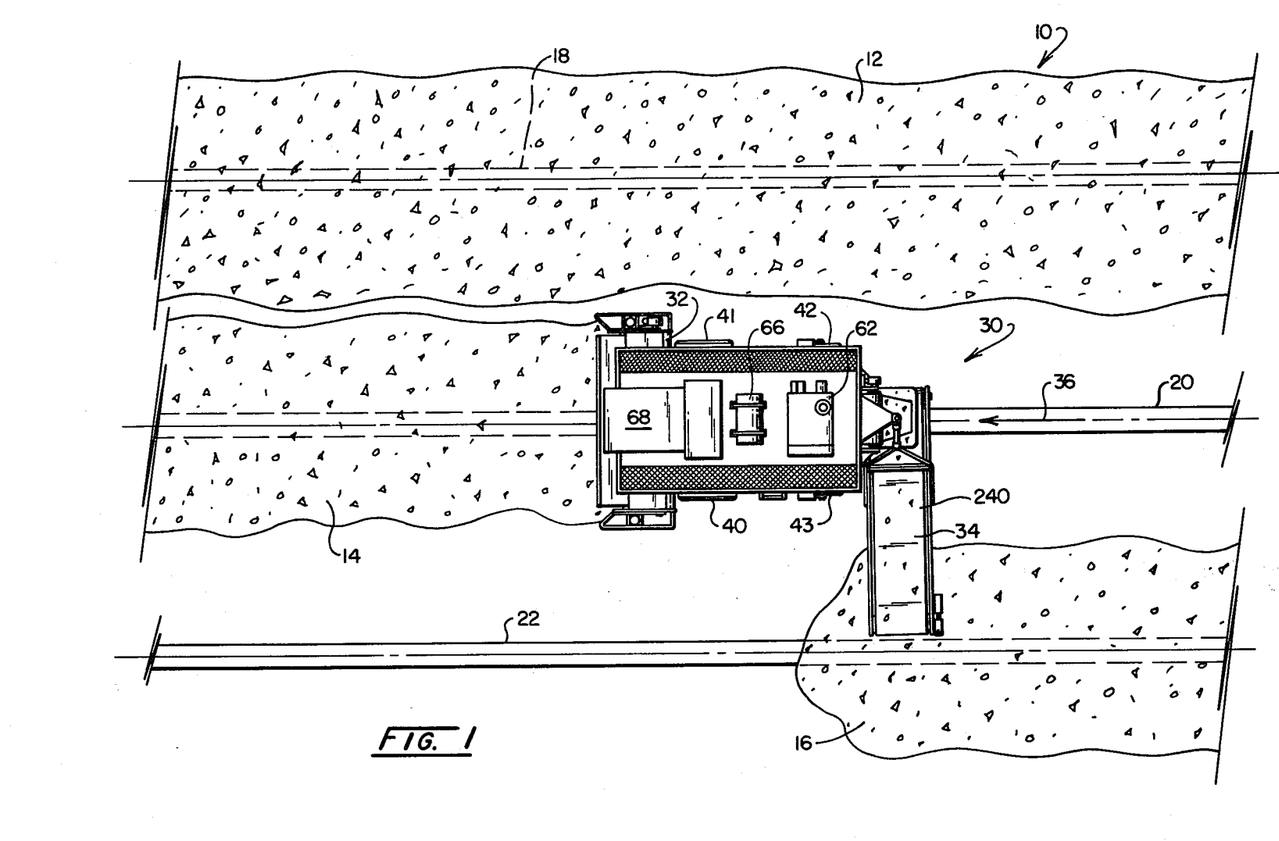
FIG. 1 is a top view of apparatus according to the invention shown operating in conjunction with biodegradable material windrows and an air duct arrangement.

Referring to FIG. 1, an overhead view of a portion of a treatment region is represented generally at 10. Such treatment regions 10 may be provided having a paved surface sufficient to support machinery and the like and will include facilities for applying moisture to the waste undergoing treatment and, in a preferred arrangement, will additionally provide a selective air injection into the waste. Such biodegradable waste is represented within region 10 in somewhat schematic fashion as selectively spaced windrows thereof at 12, 14 and 16. Each of the rows 12, 14 and 16 are shown as being oriented along a centrally disposed axis, and these axes correspond additionally with the center lines of elongate plenums, ducts or chambers shown respectively at 18, 20 and 22. Each of these plenums or chambers is part of an air control network provided by the waste treatment system wherein control over composting may be achieved. For example, when fresh or raw waste material is deposited along an initial windrow, atmospheric air may be drawn through a windrow exhibiting more advanced decomposition to effect the heating of such air and such heat air may then be directed for expulsion through the plenum of the initial windrow pile. As a consequence, the lag period often encountered in developing thermophilic bacteria may be lessened with advantages in lowering the residence interval of the material within the system as it progresses from one windrow position to the next. As is apparent, improved operation of the entire system may be realized by providing an efficient technique of windrow pile movement and deposition. It is important that the windrow cross sections be symmetrically developed above the plenums as at 18, 20 and 22 to assure uniform decomposition of biodegradable materials. Additionally, advantage may be gained by having the flexibility to build up windrow piles of greater heights than heretofore available with conventional windrow apparatus.

Figure 2:
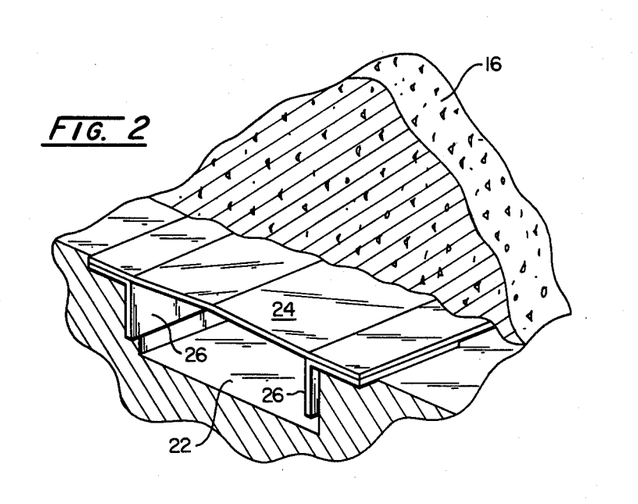
FIG. 2 is fragmentary perspective view of the treatment region of FIG. 1 showing an air duct or plenum in conjunction with a windrow pile formed by the apparatus of the invention.

Looking momentarily to FIG. 2, a fragmented perspective view of, for example plenum 22 and windrow pile 16, is revealed. As described in above-noted U.S. application Ser. No. 122,882, plenum 22 is shown to be a trench of a relatively simple rectangular cross-sectional configuration (nominally 5.7 cm deep and 16 cm wide) formed into the treating surface at a location defining the center line of each row. Plenum 22 is surmounted by a plate 24 formed of suitable metal for resistance to corrosion and rough handling which is positioned over the cavity represented by the plenum. The plate 24 may be supported by angle iron members 26 which are placed in intermittently spaced fashion under plate 24 along plenum 22 such that at such locations where there is a spacing between adjacent angle irons, there is formed a passageway between the treatment surface and plate 24. From such passageways gas or air in plenum 22 may circulate upwardly through the compost or waste windrow pile 16. The plates as at 24 generally are present as a plurality or series thereof positioned together such that quick removal of the plates at points of possible blockage to the plenum 22 may be facily corrected. It may be appreciated that by suitable arrangement of the lengths of angle irons 26 and the spaces therebetween, that partial control of the volume and flow rate of gases passing through the plenums can be effected.

Returning to FIG. 1, windrowing apparatus according to the invention is represented generally at 30 in operational confrontation with the biodegradable material within windrow 14. Apparatus 30 is self-propelled and movement thereof into windrow 14 causes a shredding, mixing and elevating of the material confronted thereby by a forwardly positioned material treating assembly represented generally at 32. This assembly 32 has a width coextensive with the mutual widthwise spacing of ducts 18 and 20 or 20 and 22. The material thus treated at assembly 32, constituting the entire width of a windrow, is transported in supportive fashion by apparatus 30 to be delivered to a row forming conveyor represented generally at 34. Thus, as windrowing apparatus 30 moves generally along a vector represented by arrow 36, a symmetrical adjacent windrow pile 16 is developed, it being observed that the row forming conveyor 34 delivers material essentially over the center line of elongate plenum 22 and the apparatus 30 requires only one pair per window. As is described in detail later herein, row forming conveyor 34 is movable by the operator such that it may deposit material not only upon the center line of plenum 22 to form windrow 16, but also over the center line of plenum 18. Further, where no transference of a windrow as at 14 is desired to provide for aeration of overly moisturized material or the like, row forming conveyor 34 may extend directly rearwardly of apparatus 30 to reposition a confronted windrow as at 14 along its associated plenum as at 20.

Windrowing apparatus 30 is supported at its forward region by two drive wheels 40 and 41 and at its rearward extent by freely-rotatable and pivotable wheels within rear wheel assemblies 42 and 43. Accordingly, by selectively controlling the drive at drive wheels 40 and 41, advantageous pivotal turning maneuvers may be carried out by the operator. By providing such pivotal turning, the extent of paved surface required for the treatment region may be minimized to enhance total facility capital investment savings.

Figure 3:
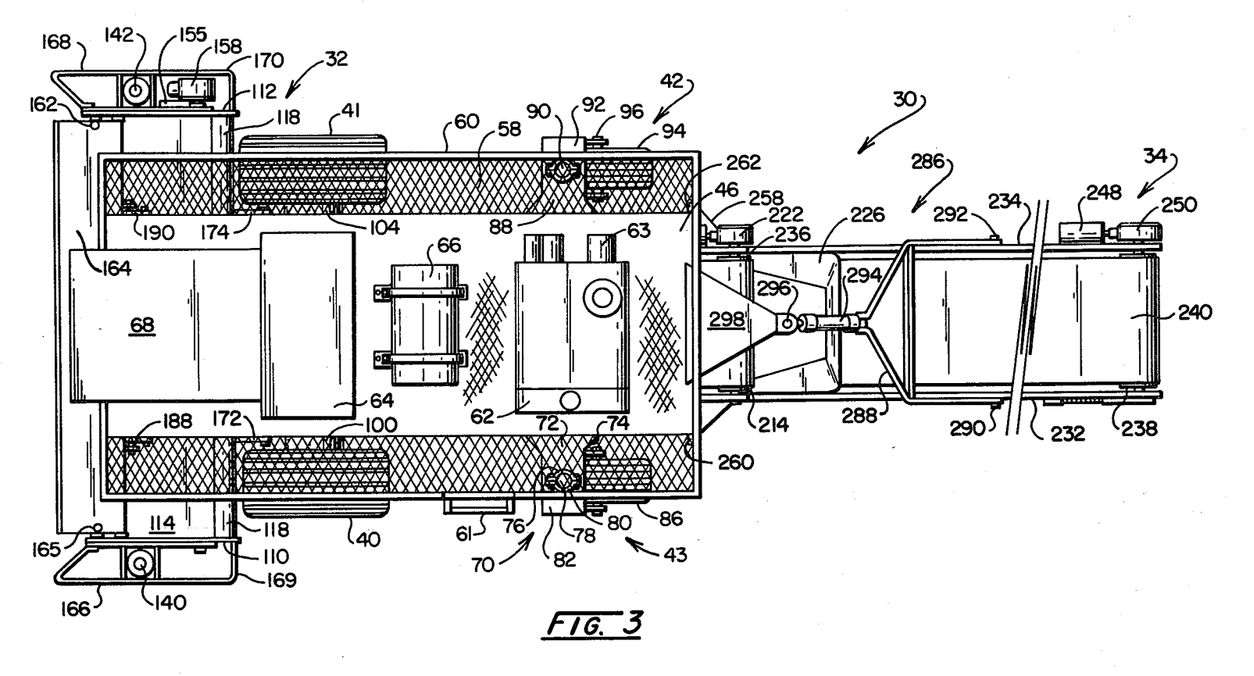
FIG. 3 is a top view of apparatus according to the invention.
Figure 4:
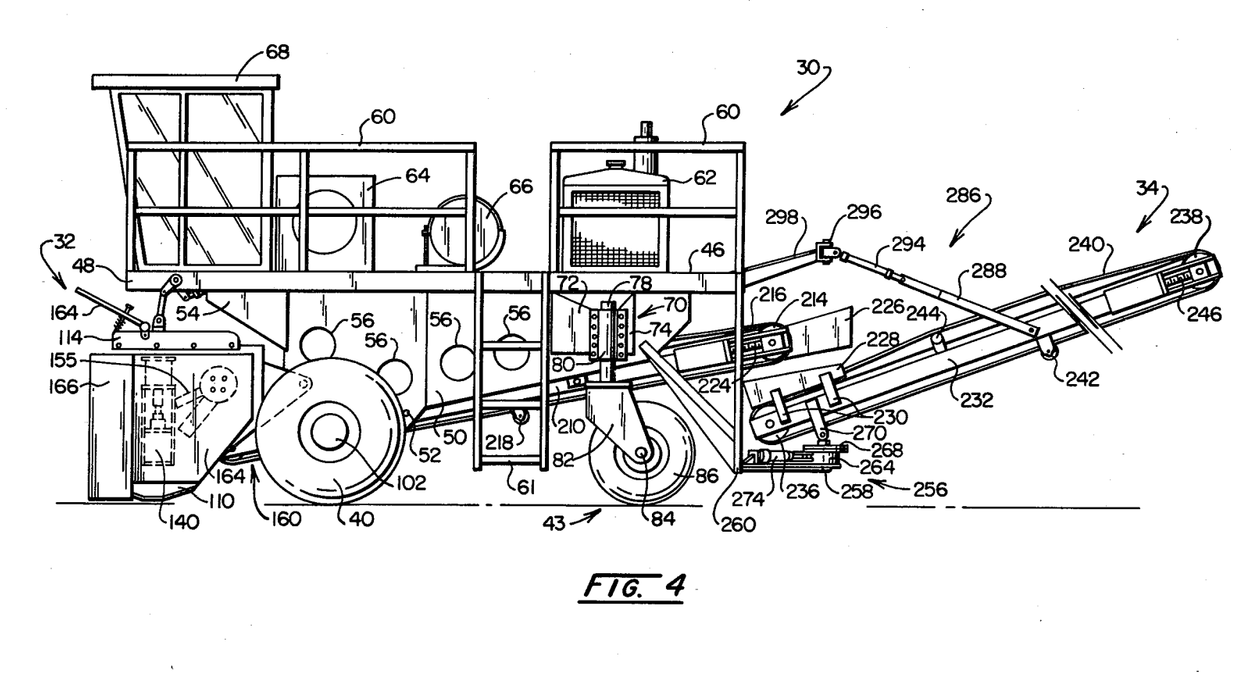
FIG. 4 is a side elevational view of apparatus according to the invention.
Figure 7:
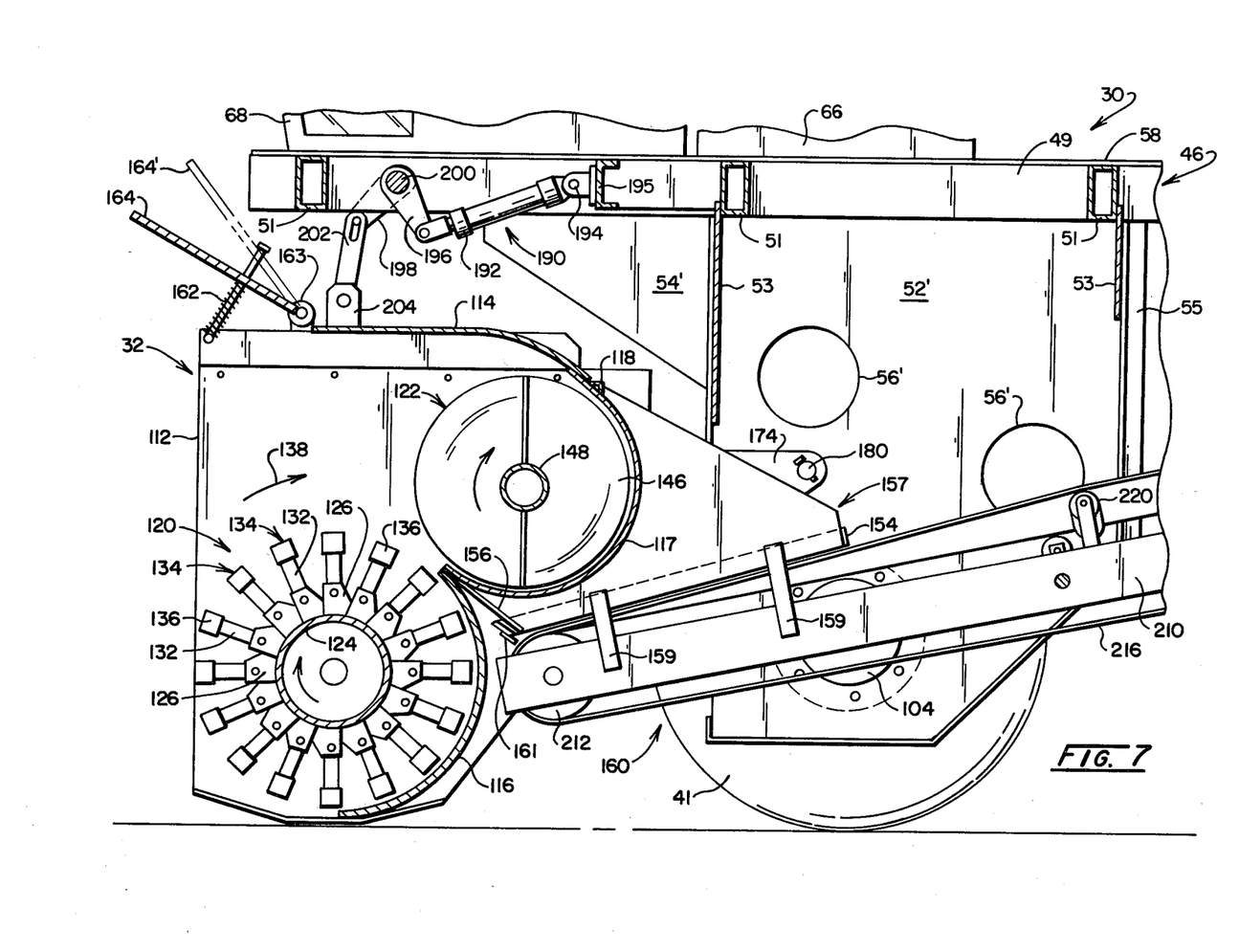
FIG. 7 is a partial sectional view taken through the plane 7—7 of FIG. 5.

Turning to FIGS. 3 and 4, the structure of apparatus 30 is revealed in more detail. In particular, a main horizontal frame is shown at 46. This frame is of rectangular shape and is formed of rigid steel box members sometimes referred to as "square tubing". An outwardly disposed one of these members is revealed in FIG. 4 at 48. The latter figure also reveals the presence of rigid body plates 50, 52 and 54 which are welded to the lower surface of member 48. Identical and symmetrically aligned body plates are provided on the opposite side of apparatus 30 and all body plates are structurally interconnected by members not shown to derive a suitably rigid chassis frame. Plates 50 and 52 additionally are shown containing circular openings 56. These openings 56 serve both to lighten the weight of the chassis as well as to provide for inspection of the components contained therewithin which are described later herein. FIG. 7 shows the body plates at the opposite side of the apparatus 30 corresponding with body plates 52 and 54. These plates are indicated with the same numeration in primed fashion along with the openings corresponding with openings 56. The latter figure also shows a rigid box member 49 spaced opposite that described at 48 as well as cross members 51 which are weldably connected between members 48 and 49. Additionally, gussets 53 are shown reinforcing, for example, body plates 52'. A similar arrangement of the structure including X-type cross members is provided throughout the frame structure 46 to evoke require rigidity. Further, angle components such as represented at 55 are provided to strengthen the overall chassis structure.

The uppermost surface of main frame 46 is shown in FIG. 3 to include open mesh decking 58 from which a safety railing 60 extends upwardly and a ladder 61 extends downwardly. Additionally incorporated at the top of frame 46 is a principal power supply including a diesel engine 62 and hydraulic pump assembly 63.

The engine component of assembly 62 may, for example, be present as a type 3208 marketed by Caterpillar Tractor Co., Peoria, Ill., which exhibits a horsepower rating of 200 HP. The hydraulic pump arrangement 63 driven by this engine component may, for example, be present as three pumps selected as series 20 and 24 marketed by Sundstrand, Corp., Belvidere, Ill. Hydraulic fluid for the pump assembly 63 is provided from a hydraulic fluid reservoir 64, the hose connection between the pump and reservoir as well as between the pump and all hydraulic motors or cylinders on the assembly 30 not being shown in the interest of clarity of the drawing. Fuel for the diesel engine is provided from a fuel tank 66 mounted upon the top of chassis frame 46, while the operator cab is shown at 68 positioned at the forwardmost portion of the frame.

Looking to the ground wheel support component of the chassis, it may be observed that wheel asseembly 43 extends from an outrigger assembly 70 welded to and extending outwardly from plate 50. In this regard, the assembly 70 includes two outwardly extending support plates 72 and 74 which are, in turn, welded to a vertically disposed semi-cylindrical shaft support 76 (FIG. 3). Within shaft 76 there is positioned a vertically disposed cylindrical bearing member 78 which is retained in position by an outer clamping plate 80 which, in turn, is secured to shaft support 76 by a plurality of bolts. Rotatably mounted within cylindrical bearing member 78 is a vertically disposed shaft (not shown) having one end welded to the top plate of a U-shaped wheel support 82. Support 82 incorporates an axle 84 which, in turn, provides rotational support for a wheel 86. Thus structured, assembly 43 provides for the free rotation of wheel 86, as well as for its capability of freely pivoting about a vertical axis extending through cylindrical bearing member 78.

Wheel assembly 42 is structured in identical fashion as assembly 42 as shown in FIG. 3, including an outrigger assembly 88, cylindrical bearing member 90, U-shaped wheel support 92, and wheel 94 rotatable upon axle 96.

FIG. 3 reveals a cylindrical housing 100 which is bolted (not shown) to chassis plate 52 and which serves to support and retain a hydraulic motor as well as a planetary gear reduction assembly represented in FIG. 4 at 102. This assembly 102 is controlled by the operator from cab 68 and derives hydraulic input from the hydraulic pump assembly 63 driven from diesel engine. In similar fashion, wheel 41 is supported by cylindrical support 104 (FIG. 3), the latter support being bolted to a chassis plate 52' (FIG. 7) which similarly contains a hydraulic motor and planetary reduction gear assembly. Wheel 41 is driven by the operator in cab 68 under power from assembly 63 and motor 62 in similar fashion as wheel 40. These hydraulic motors an planetary gear assemblies, may for example, be a Sundstrand Corp. (supra), series 20 motor and "Torque-Hub" planetary gear assembly marketed by Fairfield Engineering Co., Ill. With the arrangement thus described, the operator within cab 68 may selectively power wheels 40 and 41 such that the apparatus 30 may pivot about these wheels and thus effect turning maneuvers in a minimum of space. Such a feature wherein the assembly 30 may turn essentially within its own length permits corresponding savings in the rigid pavement required at the outboard end of each windrow.

Figure 5:
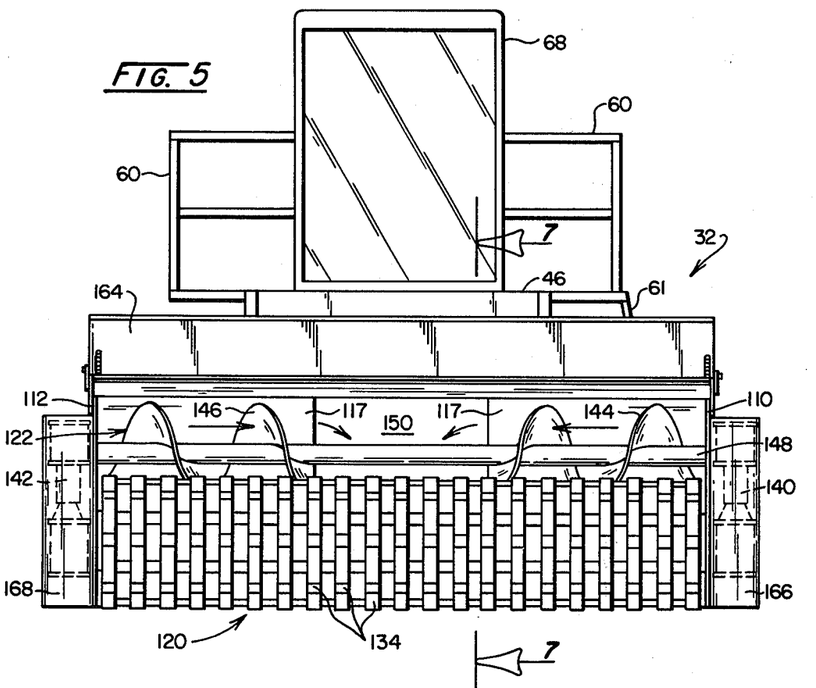
FIG. 5 is a front view of apparatus according to the invention.

Looking additionally to FIGS. 5 and 7, the structure of material treating assembly 32 is revealed. Assembly 32 is configured generally such that its housing has a widthwise extent corresponding with the width of an anticipated windrow pile as well as the spacing between the centerlines of such piles, for example, about 13 feet. This width is of greater extent than the corresponding width of mainframe 46 and associated chassis including wheels 40 and 41. As will be described later herein, the entire assembly 32 readily is removable from the wheeled chassis such that the latter may be self-transported over a highway without the burden of accommodating the highway wide-load defining width of assembly 32. Correspondingly, the removed assembly 32 may be transported separately by truck transport or the like. By arranging its widthwise extent to correspond with the anticipated widthwise extent of a windrow pile or cross-section, only one pass need to be made of a given windrow to effect a transference and treatment of materials therein.

Figure 6:
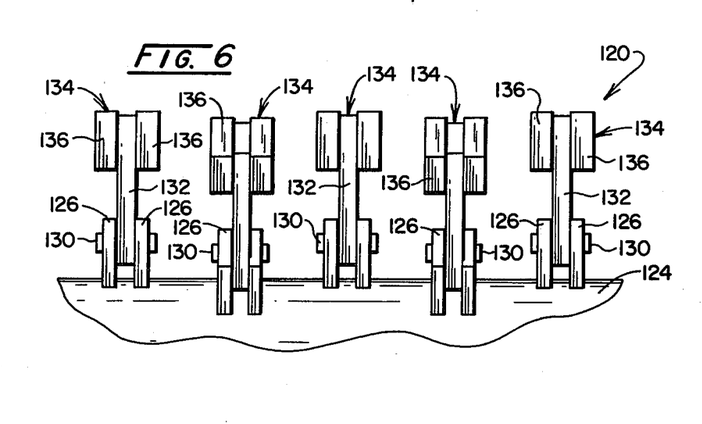
FIG. 6 is a partial front view of flail components and their mountings as utilized with the apparatus of the invention.
Figure 8:
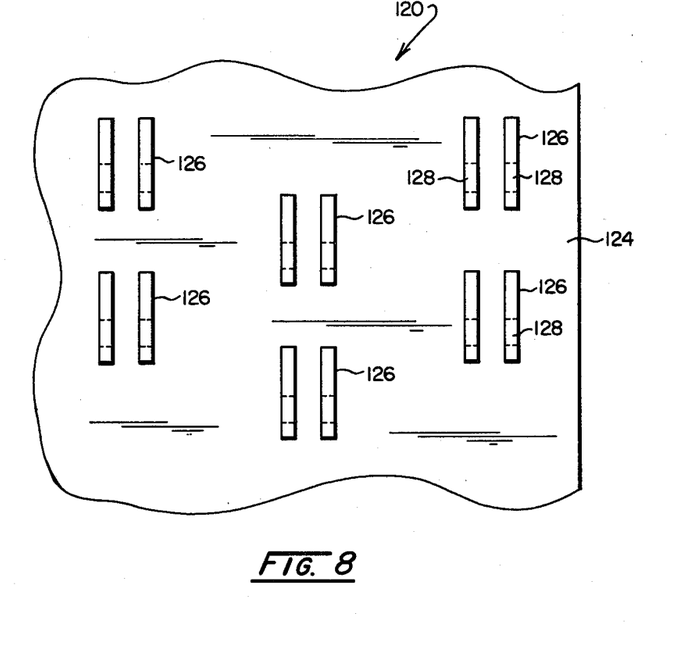
FIG. 8 is a partial development drawing showing the flail support mounting pattern of the apparatus of the invention.
Figure 9:
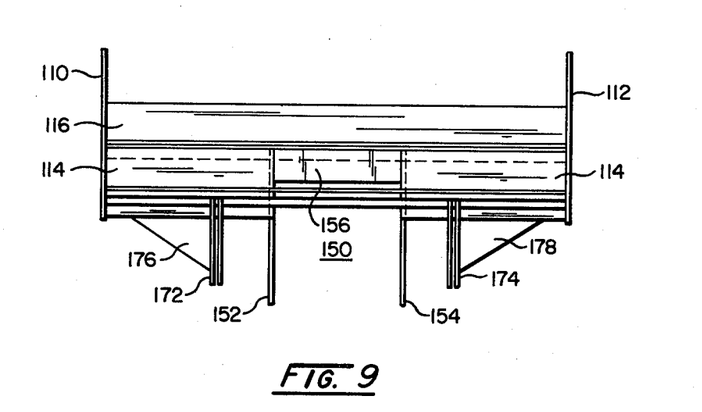
FIG. 9 is a partial top view of the housing of the material treatment portion of the apparatus of the invention.

FIGS. 3, 5 and 9 reveal that the housing portions of assembly 32 include sidewalls 110 and 112 which are coupled to a top member 114. FIG. 7 reveals the presence of an upper rear wall 118 which extends in arcuate fashion about the upper rearward portion about housing 32. Additionally, an arcuate lower rear wall 116 or processing trough and a collection trough or wall portion 117 are provided. Sidewalls 110 and 112 support the bearings for an elongate cylindrical component represented generally at 120 which serves as an elevating and shredding member, 122 as well as an upwardly disposed collecting arrangement represented generally at 120. Elevating and shredding member 120 is formed as an elongate cylinder 124 (FIG. 7) upon which are selectively positioned a plurality of flail supports certain of which are represented at 126. Supports 126 are each formed as a pair of spaced components each welded to the outer surface of cylindrical component 124. The spacing of the supports is such that the support of one given row thereof is located intermediate adjacent supports of a corresponding adjacent row. This arrangement is revealed in the partial development view of FIG. 8. Note from the latter figure, that each component within support 126 contains a bore 128 which, as revealed in FIG. 6, receives a pin connector 130 which passes therethrough to pivotally retain the elongate stem 132 of flails 134. These flails comprise the stems 132 and hammer components 136 welded to the outward tip thereof.

FIGS. 5 and 7 reveal that the elevating and shredding member 120 rotates about a horizontal axis and this rotation occurs in a directional sense inwardly into the apparatus 30 as represented by arrow 138 in FIG. 7. Drive for this rotation is provided from source 62 through hydraulic lines (not shown) connectable to hydraulic motors and gear reduction assemblies 140 and 142 affixed to respective sidewalls 110 and 112. FIG. 4 reveals assembly 140 in more detail, generally, the assemblies include a right angle drive which, in turn, is driven by a hydraulic motor, the gear reduction serving to derive requisite speed-power relationships. The drive arrangement may, for example, be present as a right angle drive Model 1010 produced Safeguard Automotive Corp., Aberdeen, S. Dak., while the associated hydraulic motor may be present as a variable displacement variety available, as a type M300 Dow max marketed by Sumitomo Heavy Industries, Japan.

During operation of the apparatus, the assemblage 120 with all associated flails is rotated at a speed sufficient to carry out a shredding of the biodegradable material being windrowed and the flails serve both to agitate and thus aerate as well as further shred and mix such material. Additionally, the assemblage 120 during operation serves to elevate the material such that it may be transported to the rearward portion of apparatus 30 for deposition at a next adjacent windrow location. To facilitate the elevating operation, the flails of assemblage 120 rotate about a locus closely adjacent the forwardly facing side of lower rear wall 116 and the latter wall serves, in effect, as a processing trough. The agitated and shredded material, being elevated and thrust in a direction represented by 138 then encounters the collecting stage 122 which, additionally, operates within the curvalinear forwardly facing surface or collecting trough 117 of upper rear wall 118 which also serves as a collection trough.

FIGS. 5 and 7 reveal that the collection stage 122 is comprised of two spiral conveyors or auger flights 144 and 146 which are mounted upon a common cylindrical shaft 148. Shaft 148 is rotatably driven by a hydraulic motor and gear assembly 158 revealed in FIG. 3 as mounted upon side plate 112. Motor assembly 158 is based for torque restraint by lever arm 155 coupled to side wall 112. The motor of assembly 158 may be a 2000 Series type manufactured by Char-Lynn Co. and marketed by J. N. Fauver Co. of North Canton, Ohio., while the gear arrangement driven thereby may be a type 920 marketed by Safeguard Automotive Corp., (supra). Augers 144 and 146 are configured respectively to provide for material movement in a right-hand and left-hand sense such that the biodegradable material elevated thereinto by assembly 120 is moved toward a collection position represented in FIG. 5 by opening 150. Looking to FIGS. 7 and 9, it may be observed that the collection trough 117 is formed having opening 150 therein and, additionally, an input chute is structured about opening 150 including side plates 152 and 154. Welded to upper rear wall 118 and trough wall 117, side plates 152 and 154 guide the material collected and moved by collector 122 to the input end of a transfer conveyor represented generally at 160 and extending through the chassis of apparatus 30. Note that a plate 156 extends from opening 150 to form the forwardmost portion of the input chute. Side plates 152 and 154 as well as plate 156 direct material from opening 150 to a small hopper 157 mounted upon the frame 210 of conveyor 160. The hopper 157 includes a forward plate assembly 161 which includes a small flexible wiper suited for clearing the belt 216 of conveyor 160. FIG. 7 further reveals that the collection station 122 is positioned such that the axis of cylindrical shaft 148 is located rearwardly of the elevator assembly 120 axis and along a radius of about 45° with respect to a vertical reference extending from the elevator and shredding member 120 axis. This positioning is considered appropriate for efficiently carrying out the collection function of the material treating assembly 32.

FIGS. 4, 5 and 7 further reveal the presence of a forward shield 164 which is present as an elongate plate. Shield 164 serves the purpose of blocking any material thrust by assembly 120 toward the cab 68. The shield 164 is pivotally connected to top member 114 of the assemblage 32 by hinge 163. Shield 164 is positioned in its normal angular orientation by a pair of spaced spring and rod assemblies 162 and 165 pivotally coupled to top member 114 and extending through a bore within the shield. The spring arrangement permits the shield to flex in the instance that the housing of assembly 32 is moved upwardly to a level wherein it may interfere with the frame 46. Additionally, a limit of travel is provided such that the plate 164 will not pivot higher than is represented in phantom at 164' in FIG. 7. The latter limitation is provided inasmuch as the entire apparatus 30 may encounter very high windrows the uppermost portions of which may contact shield 164. Assemblage 32 further includes plow type shields 166 and 168 respectively welded to side plates 110 and 112. Shields 166 and 168 serve to provide protection for the externally mounted motor assemblies as at 140, 142 and 158. FIG. 3 reveals the presence of two sheet metal covers 169 and 170 extending rearwardly of respective shields 166 and 168. These covers are removable and serve to provide additional protection for motor assemblies 140 and 142 as well as hydraulic motor 158.

As indicated earlier herein, the entire material treating assembly 32 is removably mounted upon the chassis of apparatus 30. Looking to FIGS. 7 and 9, it may be observed that pivotal mounting is provided by two support arm structures 172 and 174. These bifurcate structures are further supported respectively by gussets 176 and 178. As is revealed in FIG. 7, the entire assembly 32 is pivotally mounted upon body plates 52 and 52' by sliding the bifurcated support arm assemblies 172 and 174 thereover and positioning a pin such as represented at 180 in figure through an appropriate bore positioned both within plates 52 and 52' and the support arm assemblies 72 and 74. This provides a pivot position for assembly 32. The elevation of assembly 32 is controlled by the operator from within cab 68 through the utilization of two hydraulic cylinder driven assemblies shown in FIG. 3 in general at 188 and 190. Looking to FIG. 7, assembly 190 is revealed in more detail as including hydraulic cylinder 192 pivotally coupled to mainframe 46 at connection 194 which, in turn, is welded to a frame channel 195. The extensible piston or rod of cylinder 192 is pivotally coupled to a bell crank assemblage including arms 196 internally of frame 46 and arm 198 externally thereof. The bell crank is pivotally coupled to frame 46 by axle 200. Arm 198 is connected through an elongate slot, lost motion coupling to link 202, which is, in turn, coupled pivotally to a support 204 welded to the top member 114 of assembly 32. With the arrangement, by selectively actuating cylinder 192, the entire assemblage 32 may be pivoted about the pinned connection of its support arm assemblages 172 and 174. It will be apparent additionally that the entire assemblage 32 readily is removable from the chassis for repair or transport conveniently along highways utilizing conventional trucks and the like. As indicated earlier, the widthwise extent of assembly 32 is significant for purposes of transportation, a width of about 13 feet representing the spacing between windrow centerlines being typically utilized.

Turning to FIGS. 4 and 7, the transfer conveyor represented generally at 160 is revealed. Conveyor 160 is of conventional design including a rectangular frame 210 which supports tail and head pulleys 212 and 214 over which a belt 216 is driveably orbited. A flat return pulley is provided at 218, while a trough is formed in the upwardly disposed portions of belt 216 by a series of troughing pulleys, one of which is represented at 220. The conveyor frame 210 is mounted within the chassis of apparatus 30 by being bolted to the side plates as at 50 and 52 by conventional connectors (not shown). As revealed in FIG. 3, a hydraulic drive is imparted to pulley 214 from a hydraulic motor and right-angle reduction gear assembly represented generally at 222. FIG. 4 reveals a conventional take-up adjustment assemblage 224 for adjusting the tension imposed upon belt 216 as well as a U-shaped shield 226 attached to the outward portion of conveyor 160. The hydraulic motor assembly may, for example, be of a variety manufactured by Char-Lynn Co. and marketed by J. N. Fauver Co. (supra). The shaft mounted gear drive may be of a type 920, marketed by Safeguard Automotive Corp. (supra).

FIG. 7 shows that the conveyor assembly 160 receives elevated and collected waste material passing through the duct or chute at collection opening 150 as well as through hopper 157 and transports it within the apparatus 30 itself to the rearward portion thereof at which point the conveyance arrangement of the apparatus deposits the material under the control of shield 226 upon the lower disposed portion of windrowing conveyor 34. To assure appropriate placement of the material upon the latter conveyor, a hopper 228 is mounted upon the frame of conveyor 34 at a rearward location. FIG. 4 reveals that hopper 228 is coupled by straps as at 230 to the outwardly disposed parallel members as at 232 and 234 of the rigid rectangular frame of conveyor 34. Similar to conveyor 160, conveyor 132 is of conventional design including frame supported forward and tail pulleys 236 and 238 over which a belt 240 is driveably orbited. A flat return pulley is provided at 242, while a trough is formed in the upwardly disposed portions of belt 240 by a series of troughing pulleys, one of which is revealed at 244. A conventional take-up assemblage 246 is attached to the outwardly disposed end of frame member 232. FIG. 3 shows that the belt 240 is driven from a hydraulic motor 248 which is driveably associated with pulley 238 through a right-angle drive gear assembly 250. The latter gear assembly may, for example, be of a shaft support variety type 920 marketed by Safeguard Automotive Corp. (supra) while hydraulic motor 248 may be present as a 2000 Series marketed by Char-Lynn Co. (supra).

Figure 10:
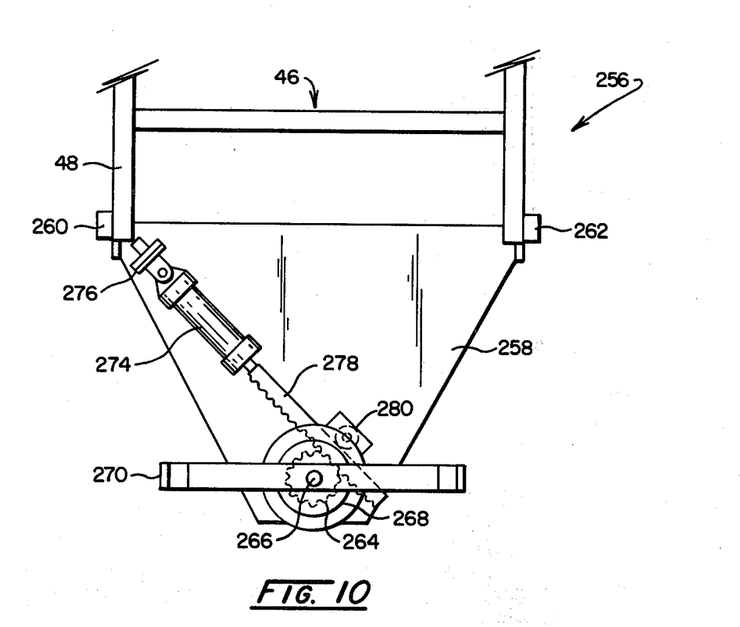
FIG. 10 is a partial top view of a portion of the windrow conveyor mounting of the apparatus of the invention.

To provide for selective windrow definition, the windrowing conveyor 34 is pivotal about both horizontal and vertical axes located at a lower mounting assembly represented generally at 256. Looking to FIGS. 4 and 10, this mounting is shown to include a lower disposed platform 258 which is weldably connected to vertically disposed support member assemblies 260 and 262. Platform 258 serves to support a mounting assembly including a gear 264 mounted upon an upstanding vertical axle 266 which additionally retains a bearing plate assembly 268. Assembly 268, in turn, supports a conveyor yoke 270 pivotally mounted upon assembly 268 and weldably connected to outward members 232 and 234 of conveyor 34. Yoke 270 is fixedly associated with gear 264 such that movement of the gear will, in turn, provide for pivoting of conveyor 34 about a vertical axis. Drive for this pivoting is provided by a dual acting hydraulic cylinder assembly 274, the rearward end of which is pivotally mounted to platform 258 at mounting bracket 276 and the drive rod output thereof is coupled to a rack 278, the teeth of which are enmeshed with the corresponding teeth of gear 264. An upstanding rotatable roller assembly 280 also is mounted upon platform 258 to maintain the operational coupling of rack 278 with the teeth of gear 268. Thus, the operator is provided the opportunity for pivoting conveyor 34 about its vertical pivotal axis to provide for selective windrow deposition.

The attitude of windrowing conveyor 34 with respect to the elevation of output thereof is derived by a height adjust assembly represented generally at 286. Assembly 286 includes a clevis which is coupled by connectors 290 and 292 to respective frame components 232 and 234. The opposite end of clevis 288 is coupled to the piston of a dual acting hydraulic cylinder 294, the opposite end of the cylinder being pivotally connected through a universal joint 296 to an outwardly depending pivot support 298. Pivot support 298 is weldably attached to frame 46 and positions universal joint 296 at a location wherein the vertical axis thereof is coincident with the axis of axle 266 of lower mounting assembly 256. Accordingly, with the arrangement both vertical positioning of conveyor 34 and horizontal positioning thereof directly rearwardly of assembly 30 or to either side thereof is made available at the option of the operator. An important aspect of apparatus 30 resides in the unusual treatment of the biodegradable material which it confronts and transfers. With this treatment, a further shredding, mixing and agitating, i.e. aerating of the material takes place by virtue initially of the forward rotating flail structure of cylindrical component 120 following which the elevation of the material to collecting arrangement 122 further effects an aeration and treatment. Following this collection, the manipulation of the material onto conveyor 160 effects still further agitation while movement upon the conveyor asserts some dynamic influence upon the material. From conveyor 160, the material is transferred to the windrow conveyor 34 thus effecting still further treatment by mixing and agitation of the material whereupon it is deposited upon the windrow of a next adjacent row, such deposition itself representing still another aerating mixing treatment of the material. Such manipulation of the biodegradable material achieves a highly desired treatment to improve the rate and uniformity of biodegradation.

Figure 11:
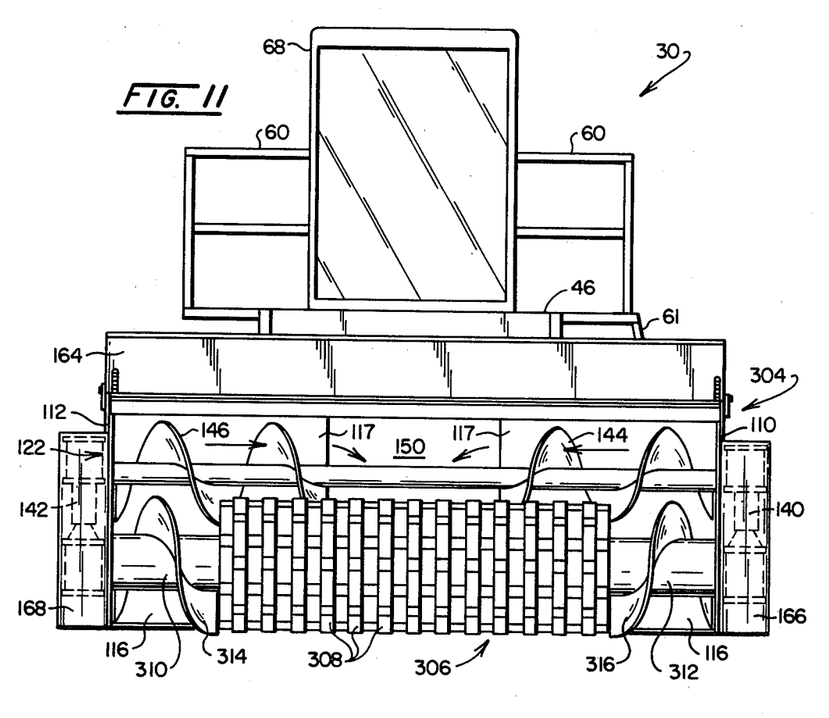
FIG. 11 is a front view of an alternate embodiment for apparatus according to the invention.

Referring to FIG. 11, an alternate embodiment for the material treating assembly 32 is represented in general at 304. Embodiment 304 is quite similar in structure as the assembly 32 described earlier herein. Accordingly, where common components are utilized, identical numeration is preserved. Note in this regard that top member 114 is retained as well as the shield 164 and the collecting arrangement 122 including augers 144 and 146 are retained in conjunction with processing trough 116 and collection opening 150. Further, the identical drives are provided for the collection assembly 122. In this embodiment, however, the earlier described elongate cylindrical component 120 now is present at 306 and has a width which is shorter than the earlier embodiment. However, the drum component still retains flails as at 308 which are identical in structure and connection as the flails 134. The cylindrical component of assemblage 306 now is supported from side plates 110 and 112 by coaxially mounted cylindrical axles or cylinders 310 and 312 which are driven, as before, by hydraulic motor and gear assemblies 140 and 142. These assemblages are positioned respectively behind shields 166 and 168. Cylindrical components or axles 310 and 312 each carry an auger configured in mutually reverse hand orientations as shown respectively at 314 and 316. These augers act in identical fashion as the auger flights 146 and 144 and are configured having a diameter substantially reaching the treating surface over which assembly 30 is driven. Accordingly, biodegradable material confronted by the augers 310 and 312 is cleared from the outwardly disposed portions of assembly 306 and moved into the operational region of flails 308. The widthwise extent of augers 310 and 312 is selected such that the area cleared resides in front of the front drive wheels 40 and 41 of the apparatus. Thus, the region of operation for these wheels is cleared and, of particular importance, the augers serve to continuously move material into the material treating system constituted by flails 308 to achieve a form of shredding and mixing residence interval improving the overall treatment of such material. Another aspect of the importance of this embodiment resides in the achievement of a lowering of the power requirements for driving cylindrical component 306.

Since certain changes may be made in the above-described apparatus without departing from the scope of the invention herein involved, it is intended that all matter contained in the description thereof or shown in the accompanying drawings shall be interpreted as illustrative and not in a limiting sense.

What is claimed is:

1. Windrowing apparatus for treating an elongate row of biodegradable material located upon a surface, comprising:
a chassis having wheel means, including front and rear wheels, for effecting the movement thereof along said surface;
elevator means mounted upon said chassis in the vicinity of said front wheels and including a plurality of elongate thrust components driveably rotatable about a forwardly disposed axis for contacting and thrusting said material engaged thereby substantially upwardly and rearwardly when said apparatus confronts said material;
collecting means mounted upon said chassis and positioned upwardly and rearwardly of said elevator means including a trough structure having an elongate first opening substantially coextensive with said elevator means, positioned for receiving said material elevated thereby, said trough structure having a second opening of substantially lesser extent than said first opening and configured to define a forward collection position, conveying means within said trough extending from the opposite ends thereof and actuable to move material received through said first opening into said second opening; and
conveyance means supported upon said chassis for receiving said material at said forward collection position and including an elongate, row-forming conveyor having a receiving end pivotally coupled with said chassis for receiving said material conveyed thereto, said conveyor being selectively manipulatable to extend an end thereof upwardly and outwardly for receiving said material conveyed thereto with respect to said chassis for transferring said material over said end at a select elevated location so as to drop vertically to form another said row of biodegradable material.

2. The windrowing apparatus of claim 1 in which said elevator means is rotatable about a horizontally disposed said axis substantially coextensive with the widthwise extent of said chassis.

3. The widrowing apparatus of claim 1 in which said elevator means comprises:
a horizontally disposed cylindrical driveably rotatable component; and
said thrust components are configured as elongate flails pivotally coupled with said cylindrical component.

4. The windrowing apparatus of claim 3 in which said elongate flails are of a length extending substantially from a lowermost position upon said cylindrical component to said surface.

5. The windrowing apparatus of claim 1 in which said conveyance means comprises:
first conveyor means mounted upon said chassis and having an input portion positioned to receive said material at said trough structure second opening for transporting said material rearwardly within said chassis to a rearward collection position; and
said row-forming conveyor receiving end is positioned for receiving transported material at said rearward collection position.

6. The windrowing apparatus of claim 5 including actuator means coupled intermediate said chassis and said row-forming conveyor for selectively establishing the height of the outwardly extending end thereof.

7. The windrowing apparatus of claim 5 in which:
said collecting means includes an input hopper mounted adjacent said second opening; said first conveyor means extends rearwardly, upwardly along said chassis to said rearward collection position; and
said first conveyor means includes an input hopper mounted beneath said rearward collection position.

8. The windrowing apparatus of claim 1 including:

motor means mounted upon said chassis for selectively effecting the rotational drive of said wheel means front wheels;

said rear wheels being freely rotatable and freely pivotal about select vertical axes.

9. The windrowing apparatus of claim 8 in which said elevator means comprises:
- a horizontally disposed cylindrical driveably rotatable component; and
- said thrust components are configured as elongate flails pivotally coupled with said cylindrical component.

10. The windrowing apparatus of claim 9 in which said elevator means includes first and second auger means mounted for coaxial rotation with and respectively positioned at opposite ends of said cylindrical component for moving said material inwardly for contact with said flails.

11. The windrowing apparatus of claim 9 in which said elevator means has a horizontal extent substantially coextensive with the widthwise extent of said chassis.

12. The windrowing apparatus of claim 10 in which said first and second auger means are configured having diameters selected such that the lowermost periphery of each extends substantially to said surface, each said first and second auger means being substantially aligned with a corresponding unique one of said front wheels so as to move said material on said surface inwardly away from the path of such wheel.

13. Windrowing apparatus for treating elongate parallel rows of biodegradable material located upon a surface, comprising:
- a chassis having wheel means including front and rear wheels, for effecting the movement thereof along said surface;
- a material treating assembly supported forwardly upon said chassis and including an elevating and shredding member having a cylindrical component driveably rotatable about a horizontally disposed axis, said component having a plurality of spaced flails pivotally coupled therewith;
- collecting means mounted upon said chassis including a spiral conveyor mounted for drivable rotation about a horizontal axis positioned upwardly and rearwardly of said cylindrical component axis and along a radius of about 45° with respect to a vertical reference extending from said cylindrical component axis, said spiral conveyor comprising a right-hand spiral flight and a left-hand spiral flight, each said flight being mounted within a housing having an elongate, forwardly disposed opening for receiving material thrust therein by said elevating and shredding member and having a downwardly disposed opening intermediate said right- and left-hand spiral flights defining a collection position; and
- conveyance means supported on said chassis for receiving said material at said collection position and transferring said material to the centerline of a select said row.

14. The windrowing apparatus of claim 13 in which said flails are of a length extending substantially from a lowermost position on said cylindrical component to said surface.

15. The windrowing apparatus of claim 14 in which each said flail comprises an elongate stem having a first end pivotally coupled with said cylindrical component and a hammer component fixed to a second end of said stem.

16. The windrowing apparatus of claim 13 in which said material treating assembly is configured having a horizontal extent substantially coextensive with the widthwise extent of said chassis.

17. The windrowing apparatus of claim 13 in which said material treating assembly further includes first and second auger means mounted for coaxial rotation with said cylindrical component and respectively positioned at opposite ends of said assembly for moving said material inwardly for contact with said flails.

18. The windrowing apparatus of claim 17 in which said material treating assembly first and second auger means are configured such that the lowermost periphery of each extends substantially to said surface.

19. The windrowing apparatus of claim 18 in which each said first and second auger means are substantially aligned with a corresponding unique one of said front wheels so as to move said material on said surface inwardly away from the path of such wheel.

20. The windrowing apparatus of claim 19 in which each said first and second auger means is configured having a widthwise axial extent substantially coextensive with the width of a said front wheel.

21. The windrowing apparatus of claim 13 in which:
- said material treating assembly has a horizontal extent substantially coextensive with the widthwise extent of said chassis; and
- said flails are of a length extending substantially from a lowermost position on said cylindrical component to said surface.

22. The windrowing apparatus of claim 21 in which said material treating assembly further includes first and second auger means mounted for coaxial rotation with said cylindrical component and respectively positioned at opposite ends of said assembly for moving said material inwardly for contact with said flails.

23. The windrowing apparatus of claim 22 in which each said first and second auger means is substantially aligned with and has a widthwise axial extent substantially coextensive with a corresponding unique one of said front wheels, so as to move said material on said surface inwardly away from the path of such wheel while developing a treatment residence interval in conjunction with said elevating and shredding member.

24. Windrowing apparatus for treating an elongate row of biodegradable material located upon a surface, comprising:
- a chassis having front and rear ground-engaging wheels;
- a housing removably mounted forwardly upon said chassis, said housing having a substantially open forwardly disposed portion extending substantially to said surface and having a rearwardly disposed collection opening;
- elevator means mounted within said housing including a plurality of elongate thrust components driveably rotatable about a horizontally disposed axis for confronting, contacting and elevating said material engaged thereby substantially upwardly and rearwardly;
- collecting means mounted within said housing at a location upwardly and rearwardly disposed with respect to said elevator means including a trough structure having an elongate first opening substantially coextensive with said elevator means, positioned for receiving said material elevated thereby, said trough structure having a second opening of substantially lesser extent than said first opening and configured to define a forward collection position, conveying means within said trough extending from the opposite ends thereof and actuable to move material received through said first opening into said second opening, said second opening corresponding with said housing collection opening; and conveyance means supported upon said chassis for receiving said material at said collection opening for transferring said material to the centerline of a select said row.

25. The windrowing apparatus of claim 24 in which said housing is pivotally coupled with said chassis so as to permit its pivotal upward movement.

26. The windrowing apparatus of claim 25 including actuator means coupled intermediate said housing and said chassis and actuable to selectively pivotally elevate said housing.

27. The windrowing apparatus of claim 24 in which said conveyance means includes an elongate, row-forming conveyor having a receiving end pivotally coupled with said chassis and selectively manipulatable upwardly outwardly and laterally with respect to said chassis for transferring said material to the center of a next adjacent said row.

28. The windrowing apparatus of claim 27 including actuator means coupled intermediate said row-forming conveyor and said chassis and actuable to selectively position said row-forming conveyor laterally outwardly from said chassis.

29. The windrowing apparatus of claim 24 in which the horizontal extent of said elevator means axis is at least coextensive with the widthwise extent of said chassis.

30. The widrowing apparatus of claim 24 including:
motor means mounted upon said chassis for effecting the select rotational drive of said front wheels; and
said rear wheels being freely rotatable and freely pivotal about select vertical axes.

31. The windrowing apparatus of claim 24 in which said conveyance means includes:
first conveyor means mounted upon said chassis and having an input portion positioned to receive said material at said housing collection opening for transporting said material rearwardly within said chassis to a rearward collection position; and
an elongate, row-forming conveyor having a receiving end pivotally coupled with said chassis and selectively manipulatable upwardly, outwardly and laterally with respect to said chassis for transferring said material to the center of a next adjacent said row.

32. The windrowing apparatus of claim 31 including actuator means coupled intermediate said row-forming conveyor and said chassis and actuable to selectively position said row-forming conveyor laterally outwardly from said chassis.

33. The windrowing apparatus of claim 24 in which said elevator means comprises a cylindrical component driveably rotatable about said horizontally disposed axis and having a plurality of spaced flails pivotally coupled with the surface thereof.

34. The windrowing apparatus of claim 33 in which said flails are of a length extending substantially from a lowermost position on said cylindrical component to said surface.

35. The windrowing apparatus of claim 34 in which each said flail comprises an elongate stem having a first end pivotally coupled with said cylindrical component and a hammer component fixed to a second end of said stem.

36. The windrowing apparatus of claim 24 in which said collecting means comprises a spiral conveyor mounted for driven rotation about a horizontal axis.

37. The windrowing apparatus of claim 36 in which said spiral conveyor horizontal axis is located rearwardly of said elevator means axis and along a radius of about 45° with respect to a vertical reference extending from said elevator means axis.

38. The windrowing apparatus of claim 36 in which:
said housing rearwardly disposed collection opening is positioned substantially at the middle of the widthwise extent of said housing; and
said spiral conveyor comprises a right-hand spiral flight and a left-hand spiral flight, each said flight being positioned within said trough structure, said second opening being intermediate said right-and left-hand flights.

39. Windrowing apparatus for treating an elongate row of biodegradable material located upon a surface, comprising:
a chassis having front and rear ground-engaging wheels;
a housing having a widthwise extent at least coextensive with the width of said chassis, said housing being rearwardly mounted upon said chassis forwardly of said front wheels and having a substantially open forwardly disposed portion extending substantially to said surface and having a rearwardly disposed collection opening positioned substantially at the middle of the widthwise extent thereof;
an elevating and shredding member mounted within said housing including a cylindrical component, driveably rotatable about a horizontally disposed axis, and a plurality of spaced flails, each pivotally coupled with said cylindrical component;
collecting means mounted within said housing and positioned upwardly and rearwardly of said elevating and shredding member including a spiral conveyor mounted for drivable rotation about a horizontal axis and along a radius of about 45° with respect to vertical reference extending from said cylindrical component axis, said spiral conveyor comprising a right-hand spiral flight and a left-hand spiral flight, each said flight being positioned within a housing component having an elongate, forwardly disposed opening for receiving material elevated thereinto by said elevator means, said collection opening being intermediate said right- and left-hand flights; and
conveyance means supported upon said chassis for receiving said material passing thereto from said collection opening and including an elongate, row-forming conveyor having a receiving end pivotally coupled with said chassis and selectively manipulatable upwardly, outwardly and laterally therefrom for transferring said material to the center of a select said row.

40. The windrowing apparatus of claim 39 in which said flails are of a length extending substantially from a lower-most position upon said cylindrical component to said surface.

41. The windrowing apparatus of claim 40 in which said conveyance means comprises:

first conveyor means mounted upon said chassis and having an input portion positioned to receive said material at said collection opening for transporting said material rearwardly within said chassis to a rearward collection position; and said row-forming conveyor receiving end is positioned for receiving transported material at said rearward collection position.

42. The windrowing apparatus of claim 41 including:

motor means mounted upon said chassis for selectively effecting the rotational drive of said front wheels;

said rear wheels being freely rotatable and freely pivotal about vertical axes.

* * * * *